Patented Nov. 8, 1938

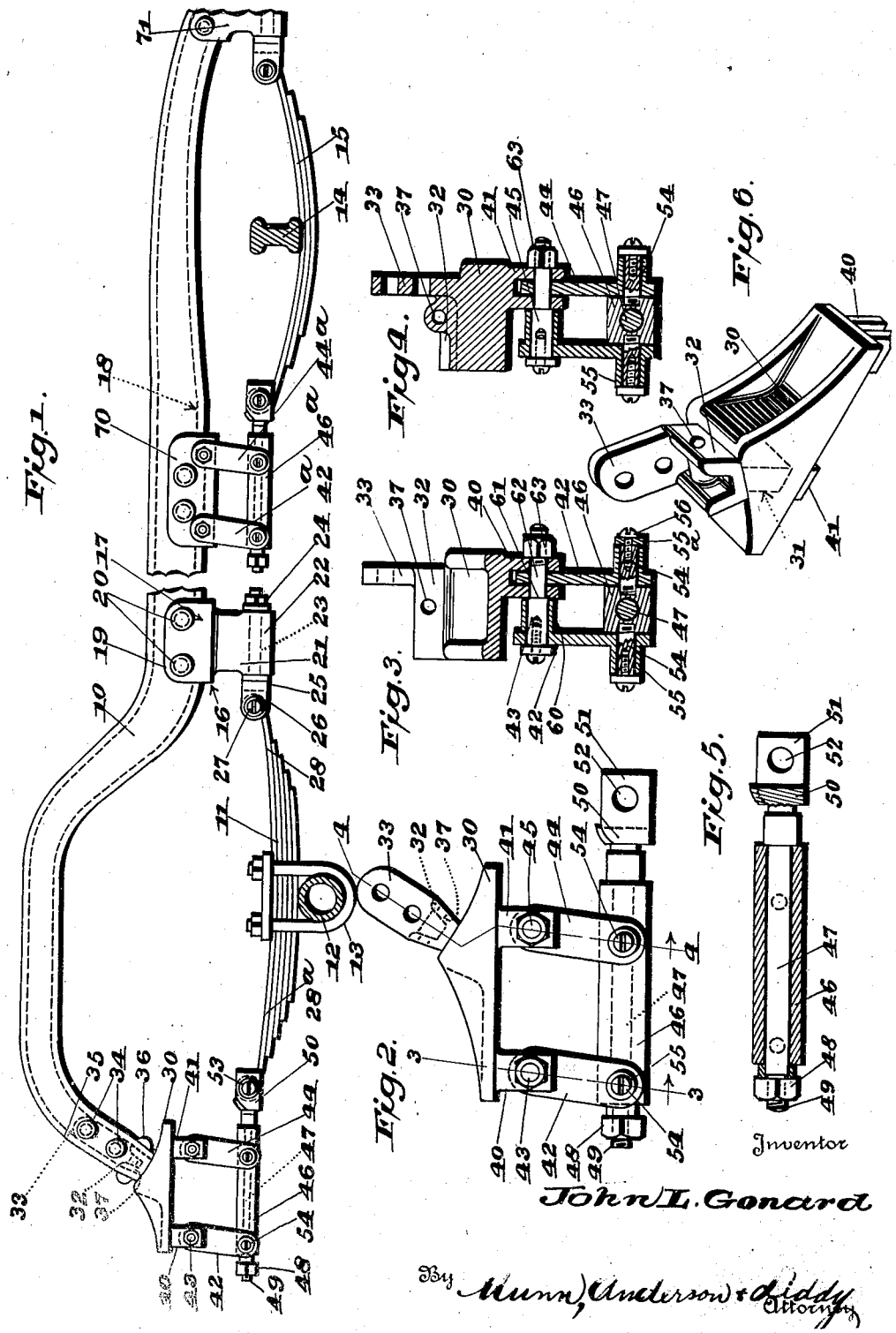

2,136,294

UNITED STATES PATENT OFFICE 2,136,294

SPRING SUSPENSION

John Louis Gonard, Englewood Cliffs, N. J.

Application February 21, 1938, Serial No. 191,812

8 Claims. (Cl. 267—54)

This invention relates to spring suspensions.

It has been proposed to rockably mount the ends of leaf springs on the frame of a vehicle in which said ends are not only permitted to rock but are permitted to shift in a definite horizontal plane but due to the fact that a great many variations are encountered in the roadbed and due to the curvature of the leaf spring the shiftable end of said spring does not tend to move in a direct horizontal plane but rather at various angles so that where the leaf spring is connected for slidable movement in a plane parallel to the frame of the vehicle the sliding bearings will bind and prevent the proper operation of the springs during the expansion and contraction of said springs.

An object of the present invention is to provide a rockable and shiftable mounting for a leaf spring of a vehicle whereby the rockable mounting may be shifted to different horizontal planes during the contraction and expansion of the leaf spring so that the shiftable connections may be moved to compensate for the various angular positions of the adjacently disposed end of the leaf spring.

Another object of the invention is the provision of a spring suspension in which a pair of the springs either at the front or back of the vehicle may oscillate through a predetermined angle to compensate for the side-sway of the body of the vehicle and to also compensate for the angular disturbance of the axle when one wheel is raised while the other wheel maintains approximately the same horizontal level along the roadbed, the compensating means including a swivel connection for one end of the leaf spring and a rockable and shiftable connection for the other end of said spring, the last-mentioned end of the spring not only being rockable in a vertical plane, said end having a shiftable connection with a swingable bearing suspended from the frame.

A further object of the invention is the provision of a spring suspension for vehicles in which one end of each spring is swivelly connected with the frame while the other end is swivelly connected with a bearing swingably suspended from the frame.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a side view of a vehicle frame showing the leaf springs swivelly connected with said frame, Figure 2 is an enlarged view of the swingable and rockable connections for one end of a leaf spring and shown in detached relation from the frame of the vehicle, Figure 3 is a transverse vertical section taken along the line 3—3 of Figure 2, Figure 4 is a transverse vertical section taken along the line 4—4 of Figure 2, Figure 5 is a vertical section of the swingable bearing shown in Figure 2, and Figure 6 is a view in perspective of a plate and bracket for supporting the swingable connections for one end of a leaf spring.

Referring more particularly to the drawing, 10 designates a U-shaped side bar of a vehicle frame which may be of any suitable shape conforming to standard requirements of various types of automobiles. The side bars 10 however may be slightly modified without affecting the principles of the invention.

A leaf spring 11 is connected to a rear axle housing 12 by means of U-bolts 13. A front axle 14 is connected to a leaf spring 15 in any approved manner. It will be noted that both of the axles are connected to the central portions of their respective leaf springs.

A bracket 16 has a base portion 17 which is adapted to engage beneath a flange 18 of the U-shaped side bar 10. An upstanding securing plate 19 is bolted, as shown at 20, to the side bar 10.

A depending portion 21 of the bracket has a bearing 22 which receives a rockable shaft 23. This shaft or pin is threaded at one end and a nut 24 screwed on the threaded portion of the pin will draw the shoulder 25 of said pin against one edge of the bearing 22.

The pin 23 is provided with a pair of spaced ears 26 which carry a pin 27 for supporting the usual spring eye at one end of the leaf spring 11. By this construction it will be seen that one end 28 of the leaf spring 11 is not only pivotally supported from the pin 27 but this pin can rock with the pin 23 whereby the said end of the leaf spring will also rock as will be presently explained.

A plate 30 has a pocket 31 in which is secured a block 32. This block has an upstanding finger 33 which is bolted at 34 to the rear end 35 of the channel beam 10. A rivet or bolt 36 passing through a perforation 37 in the block 32 and also through the flanges of the channel beam 10 aids in connecting the block and likewise the plate 30 to said channel beam.

Pairs of spaced bifurcated lugs 40 and 41 depend from the underface of the plate 30. Shackles 42 are pivotally connected at 43 with the ears on lugs 40 while shackles 44 are pivotally connected at 45 with the ears on lugs 41. These shackles are maintained in spaced relation with each other and support a bearing 46.

The bearing 46 receives a pin 47. A nut 48 screwed onto the threaded end 49 of the pin 47 prevents the pin from being discharged in one direction from the bearing 46. A head 50 connected with the opposite end of the pin 47 will prevent the loss of the pin from the bearing in the opposite direction.

The head 50 is provided with a pair of spaced ears 51 which are perforated at 52 to receive a hinge pin 53 which supports the usual spring eye at the end 28a of the leaf spring 11.

It will be noted from Figs. 2, 3 and 4 that screws 54 are threaded into the bearing 46 after passing through sleeves 55 connected to the links or shackles 42 upon opposite sides of the reciprocating pin 47. Washers 55a are held in place by means of set screws 56. A similar construction is shown for connecting the lower ends of the shackles or links 44 with the bearing 46.

The upper ends of the links 42 and 44, as has been explained, are respectively connected to the pairs of ears 40 and 41 by means of the bolts 43 and 45 and since both of these bolts and their connections for supporting the respective shackles are identical a description of one will suffice for a description of the other. The bolt 43 passes through a perforation in the upper end of one of the links 42 and through a sleeve 60. This sleeve may be formed integrally with the said shackle 42 or may be connected thereto. The sleeve, however, may be independent of the shackle. A shoulder 61 on the bolt 43 abuts one face of an ear on lug 40 while a reduced portion 62 of the bolt is received by perforations in the ears on said lug. A nut 63 is threaded onto the outer end of the reduced portion 62 of the bolt 43 for maintaining said bolt in position.

While I have shown a particular construction for pivotally supporting the links or shackles 42 and 44 from the plate 30 it will be appreciated that the ears on lug 40 may be spaced a greater distance apart so that they will engage the outer faces of the shackles 42 or 44 and a sleeve will be received by the pivoting bolt between the ears.

A spring 15 has substantially an identical connection with the side bars of the vehicle frame as the spring 11. However a bracket 70 is employed instead of the plate 30 and the variations between the plate 30 and the bracket 70 is due to the different conditions met at the point on the frame where the bracket is connected to said frame. This is also true of the supporting bracket 71 at the front end of the leaf spring 15. Nevertheless the swiveled and swinging connections for the leaf springs are identical.

When the vehicle passes over elevated portions of the roadbed or over obstructions the springs 11 and 15 will be elevated due to the raising of the axles 12 and 14. When one of the wheels only encounters an elevated portion in the roadbed the axles 12 and 14 will be elevated only at one end so that as the axles rock the springs 11 and 15 will likewise be rocked. The swivel connection for the front ends of the springs 11 and 15 will permit the spring to not only move up and down but the springs will be permitted to rock in accordance with the rocking of the axles. This is also true of the rear ends of said springs.

During the expansion and contraction of the vehicle springs 11 and 15 the rear ends of said springs will move through various angles so that the pairs of shackles 42a and 44a will permit the respective bearings carried by said shackles to assume various horizontal positions and these positions will be in accordance with the movements of the rear ends of the leaf springs. However, the bearings 46 and 46a will always be maintained parallel to a horizontal plane passing through the lower end of the frame of the vehicle so that there will be no binding between the sliding pins 47 and their respective bearings.

Due to the fact that the pins 47 are mounted for reciprocation with the bearings 46 the rear ends of the leaf springs 11 and 15 will be permitted to shift rearwardly and the rear ends of said springs will also be able to rock with the rocking or angular displacement of the axles 12 and 14.

I claim:

1. A spring suspension for vehicles comprising a frame, a leaf spring, means for swiveling one end of the spring on the frame, means for rockably and swingably mounting the other end of the spring on said frame and including a plate secured to the frame, pairs of ears depending from the plates, shackles swingable from the ears, a bearing swingably supported from the free ends of the shackles, a pivot pin rockably mounted in the bearing, and means pivotally connecting one end of the pin with the second-mentioned end of the spring.

2. A spring suspension for vehicles comprising a frame, a leaf spring, means for swiveling one end of the spring on the frame, pairs of spaced shackles pivotally suspended from the frame adjacent the other end of said spring, a bearing, means for pivotally connecting the shackles with the bearing so that the bearing may move in parallel planes, a pin rockably mounted in the bearing, and means for hingedly connecting the second-mentioned end of the leaf spring with a free end of the pin.

3. A spring suspension for vehicles comprising a frame, a leaf spring, means for swivelly mounting one end of the leaf spring on the frame, and means for rockably and swingably mounting the other end of the spring on said frame and including pairs of spaced shackles pivotally suspended from the frame, a pin pivotally connected at one end with the second-mentioned end of the leaf spring, a bearing slidably supporting said pin, and means for pivotally connecting the free ends of the pairs of shackles with the bearing at spaced points.

4. A spring suspension for vehicles comprising a frame, a leaf spring, means for swivelly mounting one end of the spring on the frame, and means for rockably and swingably mounting the other end of said spring on the frame and including a bearing, a plurality of means for swingably suspending said bearing from the frame so that said bearing will move in parallel planes, a pin slidable in the bearing, and means hingedly connecting the second-mentioned end of the leaf spring with one end of the pin.

5. A spring suspension for vehicles comprising a frame, a leaf spring, means swiveling one end of the spring on the frame, a pair of bifurcated lugs depending from the frame adjacent the other end of said spring, a pin in each lug, a link suspended from each pin, a second link suspended from each pin, a bearing pivotally supported by the free ends of the links, a rockable pin slidably mounted in the bearing, and means pivotally connecting the pin with the second-mentioned end of the leaf spring.

6. A spring suspension for vehicles comprising a frame, a leaf spring, means swiveling one end of the spring on the frame, a pair of bifurcated lugs depending from the frame adjacent the other end of said spring, a pin in each lug, a link suspended from each pin, the links being received by the bifurcated portion of the lugs, a second link suspended from each pin, a bearing pivotally supported by and between the free ends of the links, a rockable pin slidably mounted in the bearing, and means pivotally connecting the pin with the second-mentioned end of the leaf spring.

7. A spring suspension for vehicles comprising a frame, a leaf spring, means swiveling one end of the spring on the frame, a pair of bifurcated lugs depending from the frame adjacent the other end of said spring, a pin in each lug, a link suspended from each pin, the links being received by the bifurcated portion of the lugs, a second link suspended from each pin, a bearing pivotally supported by and between the free ends of the links, a rockable pin slidably mounted in the bearing, and means pivotally connecting the pin with the second-mentioned end of the leaf spring, sleeves on the supporting pins of the links spacing the second-mentioned from the first-mentioned links so that the bearing will be located substantially in vertical alignment with the sleeves.

8. A spring suspension for vehicles comprising a frame, a leaf spring, means for swiveling one end of the spring on the frame, pairs of spaced shackles pivotally suspended from the frame adjacent the other end of said spring, a bearing, means for pivotally connecting the shackles with the bearing so that the bearing may move in parallel planes, a pin rockably mounted in the bearing, means for hingedly connecting the second-mentioned end of the leaf spring with a free end of the pin, the bearing being located between the lower ends of the shackles, and means for pivotally suspending a pair of the shackles from the frame and at one side of the bearing, the last-mentioned means having an extension for pivotally suspending the other shackles.

JOHN LOUIS GONARD.